United States Patent
Von Ballmoos et al.

(10) Patent No.: US 10,232,754 B2
(45) Date of Patent: Mar. 19, 2019

(54) VEHICLE SEAT WITH A MOVABLE BACKREST AND METHOD FOR MOVING A BACKREST

(71) Applicant: LANTAL TEXTILES AG, Langenthal (CH)

(72) Inventors: Roland Von Ballmoos, Erlenbach (CH); Andreas Guehmann, Pfaffhausen (CH); Oliver Rohrbach, Oensingen (CH)

(73) Assignee: Lantal Textiles AG, Langenthal (CH)

(*) Notice: Subject to any disclaimer, the term of this patent is extended or adjusted under 35 U.S.C. 154(b) by 31 days.

(21) Appl. No.: 15/310,233

(22) PCT Filed: Apr. 28, 2015

(86) PCT No.: PCT/CH2015/000066
§ 371 (c)(1),
(2) Date: Nov. 10, 2016

(87) PCT Pub. No.: WO2015/172259
PCT Pub. Date: Nov. 19, 2015

(65) Prior Publication Data
US 2017/0136922 A1    May 18, 2017

(30) Foreign Application Priority Data

May 14, 2014 (EP) .................................... 14405044

(51) Int. Cl.
*B60N 2/02* (2006.01)
*B60N 2/90* (2018.01)
(Continued)

(52) U.S. Cl.
CPC ............... *B60N 2/914* (2018.02); *B60N 2/34* (2013.01); *B60N 2/36* (2013.01); *B64D 11/0641* (2014.12);
(Continued)

(58) Field of Classification Search
CPC ........ B60N 2/914; B60N 2/34; B60N 2/4415; B64D 11/0641; B64D 11/0647; B64D 11/0649

See application file for complete search history.

(56) References Cited

U.S. PATENT DOCUMENTS 4,669,780 A * 6/1987 Sakakibara .......... B60N 2/0232
297/257
4,735,456 A * 4/1988 Haefelfinger ............ B60N 2/34
297/243
(Continued)

FOREIGN PATENT DOCUMENTS

CN       203005156 U     6/2013
DE   10 2009 057 435 A1  6/2011
(Continued)

OTHER PUBLICATIONS

Office Action dated May 28, 2018 in corresponding Chinese Application No. 201580037661.4 with an English Translation.

*Primary Examiner* — Philip F Gabler
(74) *Attorney, Agent, or Firm* — Birch, Stewart, Kolasch & Birch, LLP

(57) ABSTRACT

The present application relates to a vehicle seat (1) comprising a seat surface (2) and at least one rest part (3.1, 3.2) at an angle to the seat surface (2). The angle between the seat surface (2) and the at least one rest part (3.1, 3.2) is movable via an adjusting device (6, 13) between a first position, in which the at least one rest part (3.1, 3.2) is substantially at right angles to the seat surface (2), and a second position, in which the seat surface (2) and the at least one rest part (3.1, 3.2) form a substantially flat surface. A second end (10.1, 10.2) of the at least one rest part (3.1, 3.2) comprises at least one pneumatic cushion (4) which is fluidically connected to a pump (7), wherein a control device is configured such that the pneumatic cushion (4) is substantially completely emptied when the at least one rest part (3.1, 3.2) moves from the first position into the second position.

14 Claims, 3 Drawing Sheets

(51) Int. Cl.
  *B60N 2/34* (2006.01)
  *B60N 2/36* (2006.01)
  *B64D 11/06* (2006.01)
(52) U.S. Cl.
  CPC ...... *B64D 11/0647* (2014.12); *B64D 11/0649* (2014.12); *Y02T 50/46* (2013.01)

(56) References Cited

U.S. PATENT DOCUMENTS

| | | | | |
|---|---|---|---|---|
| 5,918,940 | A * | 7/1999 | Wakamatsu | B60N 2/067 297/410 |
| 6,375,119 | B2 * | 4/2002 | Park | A47C 1/0352 244/118.5 |
| 6,648,407 | B1 * | 11/2003 | Michel | B64D 11/06 297/111 |
| 2014/0265506 | A1 * | 9/2014 | McMillen | B60N 2/02 297/408 |
| 2016/0236597 | A1 * | 8/2016 | Dry | B60N 2/525 |
| 2016/0272092 | A1 * | 9/2016 | Obadia | B60N 2/914 |

FOREIGN PATENT DOCUMENTS

| | | |
|---|---|---|
| EP | 0 869 060 B1 | 6/2000 |
| EP | 1 781 539 B1 | 3/2009 |
| EP | 2 234 884 B1 | 2/2012 |

* cited by examiner

VEHICLE SEAT WITH A MOVABLE BACKREST AND METHOD FOR MOVING A BACKREST

TECHNICAL FIELD

The invention relates to a vehicle seat having at least one rest part which is movable into a substantially horizontal position and which has at least one pneumatic cushion.

PRIOR ART

Vehicle seats which can be converted into a substantially horizontal bed surface by a movement of a rest part, for example of a backrest, are known in particular in aircraft construction. A fundamental problem of such vehicle seats is the increased space requirement in the longitudinal direction in the lying configuration, in particular with regard to possible collisions with other vehicle seats or elements of the vehicle. Often, in the more expensive travel classes, such seats are at least partially screened off from the rest of the cabin by a frame or partition, in order to provide a passenger with the greatest possible privacy. It is specifically when such frames or partitions are present that the increased space requirement of the aircraft seat in a lying configuration is problematic, since the space taken up by a seat is additionally limited by the frame or partition.

EP 0 869 060 (Singapore Airlines) discloses aircraft seats accommodated in a frame. On being transferred from a sitting position into a lying position, the seat is moved forward relative to the frame and the seat surface and the backrest are pivoted with respect to the frame. Individual parts of the seat, for example the headrest, can comprise pneumatic elements in order to allow the seat to be adapted to the requirements of the users.

EP 2 234 884 B1 (British Airways) describes an aircraft passenger seat which can be converted into a substantially flat bed. The seat comprises a seat surface, a backrest and a shell which partially surrounds the seat. A headrest of the backrest is embodied in a movable manner and has a pneumatic element by way of which the headrest can be pivoted, in particular in order to provide the head of a passenger with optimum support. When the backrest is lowered into the lying position, the air in the pneumatic element can be let out automatically, such that the headrest takes up a horizontal position.

EP 1 781 539 B1 (Premium Aircraft Interiors) discloses an aircraft seat which can be converted into a bed. The aircraft seat is arranged at an angle to the cabin wall, such that a resulting triangular space between the head end of the seat and the cabin wall can be used in the lying position of the seat. In order to allow the backrest to be lowered without colliding with the cabin wall, the length of the combination of backrest and headrest is temporarily shortened during lowering. A relative displacement between the backrest and headrest takes place via drive means, such that said backrest and headrest are moved toward one another during lowering and are moved apart again after lowering has finished.

The vehicle seats known from the prior art have the drawback that they have to have a complicated and therefore heavy mechanism in order to allow a rest part to be pivoted into a lying position. Furthermore, on account of the sometimes complicated sequence of movements of the individual seat parts, the sitting comfort for a passenger is significantly impaired while the seat is being adjusted into the lying position.

SUMMARY OF THE INVENTION

It is the object of the invention to create a vehicle seat which belongs to the technical field mentioned at the beginning, allows transfer from a sitting position into a lying position that is as easy as possible, and has a structure that is as simple as possible and a weight that is as low as possible.

The achievement of the object is defined by the features of claim 1. According to the invention, the vehicle seat comprises a seat surface and at least one rest part at an angle to the seat surface. The angle between the seat surface and the at least one rest part can be altered via an adjusting device between a first position, in which the at least one rest part is substantially at right angles to the seat surface, and a second position, in which the seat surface and the at least one rest part form a substantially flat surface. The at least one rest part rests on the seat surface at its first end. A second end of the rest part comprises at least one pneumatic cushion which is fluidically connected to a pump. The pump is controlled via a control device which is configured such that the pneumatic cushion is substantially completely emptied or inflated by the pump when the backrest moves from the first position into the second position.

As a result of at least one pneumatic cushion being provided, the length of the at least one rest part can be altered dynamically and be adapted to the respective position of the at least one rest part relative to the seat surface. Since no mechanism is required for this purpose, the vehicle seat can be constructed in a relatively simple manner and weight can be saved, this having significant advantages in particular on use as an aircraft seat. In addition, as a result of the dynamic adaptation of the length of the at least one rest part by way of the inflation and emptying of the at least one pneumatic cushion when the at least one rest part moves, a collision between the second end of the at least one rest part and a further vehicle seat or some other cabin element can be prevented.

Within the meaning of the present application, a "vehicle" is understood to be any means of transport with which persons can be transported on land, in the air or on water. These are in particular automobiles, buses, trains, aircraft, helicopters, boats and ships. Accordingly, the term "vehicle seat" is understood to mean a seat for use in one of these vehicles.

The adjusting device is preferably equipped with an electric motor such that the angle between the seat surface and the at least one rest part can be adjusted by a user of the vehicle seat via a corresponding control unit. Alternatively, however, the adjusting device can also consist only of a mechanism which allows the at least one rest part to be adjusted by pushing or pulling on the part of the user and allows the rest part to be locked at a particular angle between the seat surface and backrest.

The first position corresponds to a normal sitting position. In this case, the at least one rest part is substantially at right angles to the seat surface. In the present application, "substantially" means a deviation of at most 10°, but preferably at most less than 5° from a right angle. Particularly preferably, both the seat surface and the at least one rest part have a cushion, the firmness of which is settable and which is configured in particular as at least one further pneumatic cushion.

In the second position, the angle between the backrest and the seat surface is about 180°, i.e. the seat surface and the at least one rest part form a substantially flat surface which is suitable in particular for lying.

The adjusting device is preferably configured such that it is possible to lock the at least one rest part at any desired angle between the first and second positions, in order that a user of the vehicle seat is provided with the greatest possible degree of flexibility when setting a sitting position that is comfortable for him.

The second end of the rest part comprises at least one pneumatic cushion. A "pneumatic cushion" is understood to be a chamber which is enclosed by an extensive material and can be inflated with a fluid, in particular with air. Accordingly, the volume of a pneumatic cushion can be altered by varying the amount of fluid with which it is filled. Particularly preferably, the volume of the at least one pneumatic cushion of the vehicle seat according to the invention can be altered by active inflation and emptying.

Particularly preferably, the second end of the rest part consists exclusively of the at least one pneumatic cushion.

The at least one pneumatic cushion is particularly preferably arranged in the direction of extension of the rest part. When the at least one pneumatic cushion is in the completely inflated state, the at least one rest part thus has a greater length than when the at least one pneumatic cushion is in the completely emptied state. Accordingly, the overall length of the at least one rest part can be increased or reduced by respectively inflating and emptying the at least one pneumatic cushion.

The at least one pneumatic cushion is inflated and emptied preferably by a pump which is fluidically connected to the pneumatic cushion. Via at least one feed line, the pump can either pump a fluid into the at least one pneumatic cushion or extract same therefrom by suction.

The at least one feed line preferably has at least one valve with which the fluidic connection between the pump and the at least one pneumatic cushion can be interrupted or enabled. As a result, several pneumatic cushions can be inflated or emptied with the same pump. Particularly preferably, several such valves are combined in a valve block. This has the advantage that all of the valves for one or more vehicle seats are gathered centrally in one location, wherein the connection between each valve and the corresponding pneumatic cushion takes place via a specific feed line. Furthermore, a pump can be assigned to each valve block. This simplifies the construction of the vehicle seat and allows easier maintenance and easy replacement of the valves.

Alternatively, the vehicle seat can also have connection valves by way of which the at least one pneumatic cushion can be connected to a compressed air system and/or negative pressure system of the vehicle, wherein, in this case, the inflation and emptying of the at least one pneumatic cushion is controlled via corresponding valves. Further preferably, the vehicle seat comprises further pneumatic cushions on the seat surface and/or the at least one rest part, wherein these can be at least partially inflated and emptied by the control device in order to allow the user to individually set the firmness of these surfaces or of subregions of these surfaces.

The control device is preferably an electronic controller which comprises a microchip and a memory module.

The control device is preferably equipped with at least one sensor or is connected to the adjusting device via an interface, in order to be able to determine the angle between the at least one rest part and the seat surface. Thus, when a particular angle between the seat surface and the at least one rest part is reached, the at least one pneumatic cushion can be emptied or inflated.

In the context of the present application, "substantially completely emptied" means that the volume of the pneumatic cushion is present in a form reduced to less than 2%, particularly preferably to less than 1% of the completely inflated volume by removal of the fluid.

Particularly preferably, the at least one rest part is configured as a backrest, wherein the control device is configured such that the at least one pneumatic cushion is substantially completely emptied when the backrest moves from the first position into the second position.

As a result, a collision between the backrest and a further vehicle seat or an element of the vehicle cabin can be efficiently prevented during the movement of the backrest.

Preferably, the control device is configured such that the at least one pneumatic cushion is present in a completely emptied state in the second position of the backrest. As a result, the area required for the vehicle seat in the second position can be reduced compared with a vehicle seat in which no change in length of the backrest takes place.

In a further, particularly preferred embodiment, however, the control device is configured such that the at least one pneumatic cushion is initially completely emptied when a first predetermined angle between the seat surface and the backrest is reached and is inflated again when a second predetermined angle is reached, wherein the at least one pneumatic cushion is in an at least partially inflated state when the backrest reaches the second position. As a result, on passing through a particular region, a collision of the backrest with an element of the vehicle cabin can be prevented during the movement of the backrest.

For example, in the case of aircraft seats which are at an angle to the cabin wall, when the backrest is adjusted, there may be a region in which the backrest would collide with the cabin wall. As a result of the at least one pneumatic cushion being emptied, the length of the backrest can be reduced to such an extent that it is possible for the second end of the backrest to pass the cabin wall without colliding with it. Since, on account of the curvature of the cabin wall, more space is available between the second end of the backrest and the cabin wall again when the second position is reached, after the second end of the backrest has passed through, the at least one pneumatic cushion can be at least partially, but preferably completely inflated again in order that a user of the aircraft seat is provided with the largest possible bed surface.

Preferably, the vehicle seat has a frame which at least partially encloses the second end of the backrest in the second position.

The frame encloses at least a part of the vehicle seat in order to allow at least partial separation of the seat region from the interior of the vehicle. In particular when the vehicle seat according to the invention is used as an aircraft seat, a user can be provided with a degree of privacy. The frame particularly preferably extends behind the backrest and partially to the side of the seat. As a result, a kind of "single-cabin feeling" can be created for a user. In addition, shelf space or other functional elements, such as extending tables or entertainment systems can be integrated on and in the frame.

Particularly preferably, the frame is configured such that the second end of the backrest is entirely enclosed thereby in the second position. This screens a user off from vehicle noises or fellow travelers while he is sleeping and thus increases his comfort. In the first position, the second end of the backrest having the at least one pneumatic cushion is preferably not enclosed by the frame.

Preferably, the frame is arranged so as to be immovable at least in the horizontal direction relative to the seat surface. Since the overall length of the backrest can be reduced by the emptying of the at least one pneumatic cushion, a relative movement between the seat surface and the frame is not necessary in order to prevent a collision of the backrest with the frame while the backrest is being adjusted into the second position.

Particularly preferably, the seat surface is configured so as to be immovable only with regard to a movement in the horizontal direction relative to the frame, while a vertical movement relative to the frame remains possible. As a result, the distance of the seat surface from the vehicle floor can be altered, thereby allowing optimum adaptation of the seat height to the size of a user, in particular to his leg length. Furthermore, provision can also be made for the angle of at least a part of the seat surface to the vehicle floor to be able to be varied. As a result, a user can set the vehicle seat optimally to his requirements.

Preferably, the rest part is in the form of a legrest, wherein the control device is configured such that the at least one pneumatic cushion is substantially completely inflated by the pump when the legrest moves from the first position into the second position. As a result, optimal support for the legs of a user of the vehicle seat can be achieved.

Particularly preferably, the control device is further configured such that the at least one pneumatic cushion of the legrest is in a completely inflated state in the second position. Usually, in the first position, the legrest is dimensioned such that it reaches to the vehicle floor or leaves an intermediate space in between in order to make it possible to stow relatively small items of luggage under the seat. When the legrest moves into the second position, the length of the legrest is then too short to fully support the legs of the user. Therefore, in higher booking classes in aircraft, provision is often made of what are known as "ottomans", on which a user of the seat can rest his feet. However, on account of the limited length of the legrest, a gap generally remains, and this can have a negative effect on lying comfort. As a result of the inflation of the at least one pneumatic cushion, continuous support for the user's legs can now be achieved in that this gap is bridged by the at least one pneumatic cushion, significantly increasing lying comfort.

Preferably, the control device is configured such that the at least one pneumatic cushion is inflated or emptied depending on the angle between the seat surface and the at least one rest part.

As a result, a length of the at least one rest part that is always optimal can be set, with the result that no collision between the at least one rest part and a further vehicle seat or some other element of the vehicle cabin takes place. The at least one pneumatic cushion is emptied or inflated by the pump preferably when a particular angle between the at least one rest part and the seat surface is reached. Accordingly, the control device is coupled to the adjusting device. Alternatively, a sensor connected to the control device can monitor the angle between the seat surface and the at least one rest part. Further preferably, provision can also be made for the at least one pneumatic cushion to be emptied continuously when the at least one rest part is adjusted from the first position in the direction of the second position or to be inflated continuously upon adjustment from the second position in the direction of the first position, or vice versa.

Preferably, the vehicle seat comprises a pressure sensor which continuously measures the pressure of a fluid located in the at least one pneumatic cushion. The control device is furthermore configured such that, in the event of a predetermined maximum pressure being exceeded, fluid is emptied from the at least one pneumatic cushion by the pump until the predetermined maximum pressure is reached.

As a result, in the event of any collision between the at least one pneumatic cushion and an obstacle during the movement of the at least one rest part, the at least one pneumatic cushion is automatically emptied to such an extent that it can move past the obstacle without being damaged. Specifically, if no fluid were pumped out, in the event of a collision between the at least one pneumatic cushion and an obstacle, for example a wall of the vehicle cabin, said cushion could be squashed between the at least one rest part and the obstacle with the result that the pressure of the fluid in the interior of the at least one pneumatic cushion would rise. As a result of this rise in pressure, the at least one pneumatic cushion could be damaged, for example torn.

As a result of the pressure being continuously measured, appropriate emptying of the fluid by the pump can take place at any time, i.e. for example even when the rest part is not being moved. As a result, damage to the at least one pneumatic cushion by collisions with objects, for example items of luggage falling out of a luggage compartment, can be prevented.

All pressure sensors that allow continuous pressure measurement and are known to a person skilled in the art can be used as the pressure sensor. In the context of the present invention, "continuous pressure measurement" is also understood as meaning any measurements in which the pressure is measured only at times, but at regular and short intervals, for example every few microseconds up to at most every 5 seconds.

Preferably, the pressure sensor is arranged in or on a feed line between the pump and the at least one pneumatic cushion. If a valve block is used, a pressure sensor can be arranged on each valve on the feed-line side. This allows a simple construction of the vehicle seat.

Such continuous pressure measurement with subsequent readjustment of the pressure if the predetermined maximum pressure is exceeded can be used not only in the context of the present invention but can also be used in other applications in which a pneumatic cushion is used. Thus, such regulation can also be used for example for pneumatic cushions which are used as seat surfaces, backrests, partitions, bases, bed surfaces or the like. Quite generally, it is thus possible to fit pneumatic cushions in a wide variety of fields of application.

The predetermined maximum pressure in the interior of the at least one pneumatic cushion of the vehicle seat according to the invention is preferably 5 kPa (50 mbar). Depending on the use purpose of the pneumatic cushion, however, it is also possible to provide other maximum pressures, for example 10 kPa (100 mbar) or 1 kPa (10 mbar).

Particularly preferably, the vehicle seat according to the invention is an aircraft seat. As a result of the space- and weight-saving construction and the increased comfort for the user, a vehicle seat according to the invention is excellently suitable for use in aircraft, in particular in cabins of the higher booking classes.

The present application also relates to a method for moving at least one rest part of a vehicle seat from a first position, in which the at least one rest part is substantially at right angles to a seat surface, into a second position, in which the at least one rest part forms a substantially flat surface with the seat surface. A second end of the at least one rest part comprises at least one pneumatic cushion which is completely emptied or inflated by a pump during a movement from the first position into the second position.

The inflation and emptying by the pump preferably takes place in a fully automated manner, for example by a control device which, depending on the angle between the at least one rest part and the seat surface, causes the at least one pneumatic cushion to be inflated or emptied by the pump. For example, the control device can be coupled to the adjusting device. Alternatively, a sensor connected to the control device can also detect a movement of the at least one rest part from the first position into the second, or vice versa.

Preferably, a backrest is moved, wherein the at least one pneumatic cushion is completely emptied during the movement from the first position into the second position.

In particular under confined space conditions within a vehicle, as a result of the at least one pneumatic cushion being completely emptied, the length of the backrest can be reduced during a movement from the second position into the first position, as a result of which it is possible to prevent any collision between the second end of the backrest and a further vehicle seat or some other element of the vehicle cabin. This is advantageous in particular in the case of aircraft seats, since in this way more seats can be arranged behind one another as a whole without there being the risk of a collision with another vehicle seat or an element of the cabin when the backrest is adjusted into the second position.

Preferably, the at least one pneumatic cushion is completely emptied by the pump when a first predetermined angle between the backrest and the seat surface is reached, and is subsequently filled again when a second predetermined angle is reached, such that the at least one pneumatic cushion is in an at least partially filled state when the second position is reached by the backrest.

This allows a reduction in the length of the backrest during at least a part of the movement between the first position and the second position, such that for example a collision with an element of the vehicle cabin can be prevented. Subsequently, the at least one pneumatic cushion is filled again in order for example to provide a user of the vehicle seat with a maximum bed surface.

The two angles are determined on the basis of the actual spatial conditions in the interior of the cabin of the vehicle, wherein they are particularly preferably stored in the control device. Preferably, the first predetermined angle is 40° and the second predetermined angle is 75°.

Preferably, the at least one pneumatic cushion is present in a completely emptied form in the second position of the backrest. This allows a reduction in the area required for the vehicle seat in the second position, with the result that more seats can be arranged one behind another in the vehicle cabin.

Further preferably, a legrest is moved, wherein the at least one pneumatic cushion is completely inflated when the legrest moves from the first position into the second position.

As a result, in the second position, which corresponds to a lying or relaxing position, the legrest can have a sufficiently long length to optimally support the legs of a user of the vehicle seat.

Preferably, the pressure of a fluid filled into the at least one pneumatic cushion is continuously measured by means of a pressure sensor, wherein, in the event of a predetermined maximum pressure being exceeded, fluid is emptied from the at least one pneumatic cushion via the pump until the pressure corresponds to the maximum pressure.

This allows the at least one pneumatic cushion to squeeze through between the at least one rest part and an obstacle, even in the event of faulty operation of the control device during the emptying or inflation of the at least one pneumatic cushion, since an increase in the pressure in the interior of the at least one pneumatic cushion as a result of the collision with the obstacle automatically results in a reduction by the pump in the fluid filled in the at least one pneumatic cushion.

This method step does not necessarily have to be used only in combination with the method according to the invention for moving at least one rest part, but can also be used independently thereof in pneumatic cushions of any kind.

Further advantageous embodiments and combinations of features of the invention can be gathered from the following detailed description and the entirety of the claims.

BRIEF DESCRIPTION OF THE DRAWINGS

In the drawings used to explain the exemplary embodiment.

In principle, identical parts are provided with identical reference signs in the figures.

WAYS FOR IMPLEMENTING THE INVENTION

Figure 1:
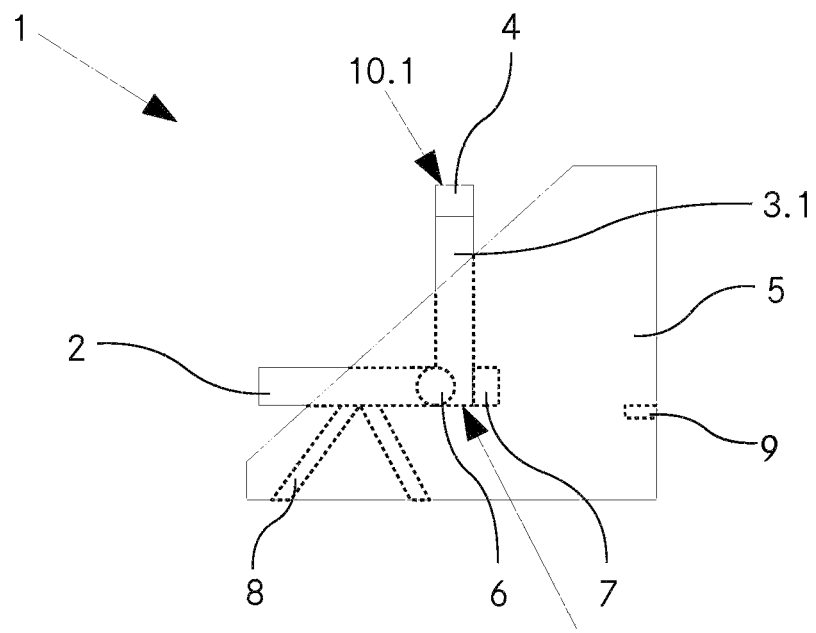
FIG. 1 shows a vehicle seat according to the invention having a backrest in the first position.

FIG. 1 shows an embodiment of a vehicle seat 1 according to the invention having an adjustable backrest 3.1 in a first position. In this first position, a backrest 3.1 is substantially at right angles to a seat surface 2 of the vehicle seat 1. Via an adjusting device 6, the angle between the seat surface 2 and the backrest 3.1 can be altered, i.e. the backrest 3.1 can be moved relative to the seat surface 2. Preferably, the adjusting device 6 comprises an electric motor with which the angle between the seat surface 2 and the backrest 3.1 can be adjusted. At a first end 11.1, the backrest 3.1 rests against the seat surface 2. The second end 10.1 of the backrest 3.1 comprises a pneumatic cushion 4 which serves as a headrest. The pneumatic cushion 4 is connected to a pump 7 via feed lines (not shown), wherein the pneumatic cushion 4 can be inflated and emptied via the pump 7. In the first position, the pneumatic cushion 4 is in a completely inflated state, i.e. the backrest 3.1 has a maximum length in this position. The pump 7 is in this case controlled by a control device (not shown), i.e. the control device provides the pump 7 and any valves present with corresponding control commands for inflating or emptying the pneumatic cushion.

The vehicle seat is connected to a floor of the vehicle via a corresponding substructure 8, which is configured for example as legs in the embodiment shown. Furthermore, the vehicle seat 1 is partially enclosed by a frame 5. In the first position, the second end 10.1 of the backrest and thus the pneumatic cushion 4 are not enclosed by the frame 5. If the backrest 3.1 is moved into the second position, the frame 5 at least partially encloses this second end 10.1 with the pneumatic cushion 4. The frame 5 has a support 9 which supports the backrest 3.1 in the second position (as shown in FIG. 2).

Figure 2:
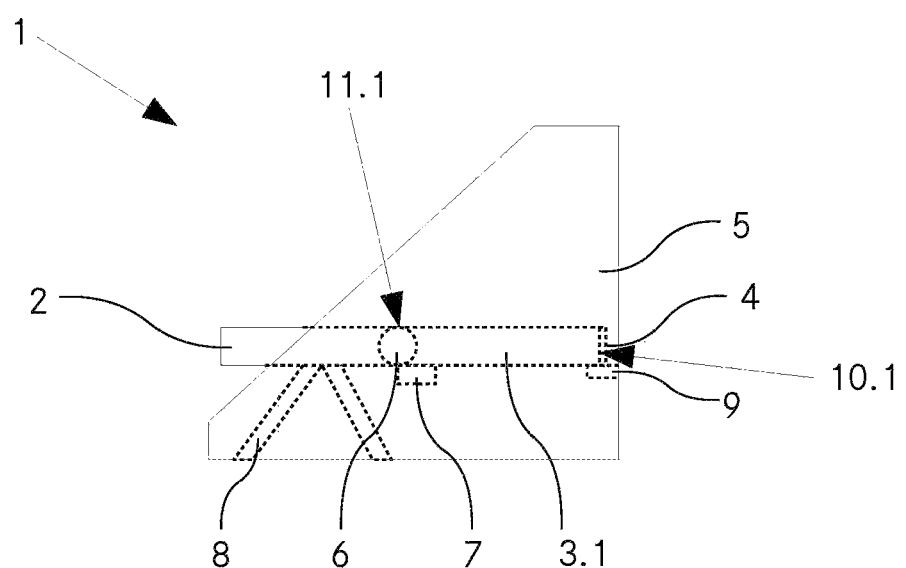
FIG. 2 shows the vehicle seat from FIG. 1 with the backrest in the second position.

FIG. 2 shows the vehicle seat 1 from FIG. 1 in the second position. The seat surface 2 and the backrest 3.1 form a substantially flat surface, i.e. the angle between the seat surface 2 and the backrest 3.1 is approximately 180°. In this second position, the pneumatic cushion 4 is completely empty, i.e. the backrest 3.1 has a minimum length. As a result of this reduction in the length of the backrest 3.1, a collision with the frame 5 which encloses the second end 10.1 with the pneumatic cushion 4 in the second position is avoided. In a configuration of the vehicle seat 1 without a pneumatic cushion 4, the frame 5 would have to be configured in a longer manner in the horizontal direction, with the result that the necessary area for the vehicle seat 1 would be increased.

Figure 3A:
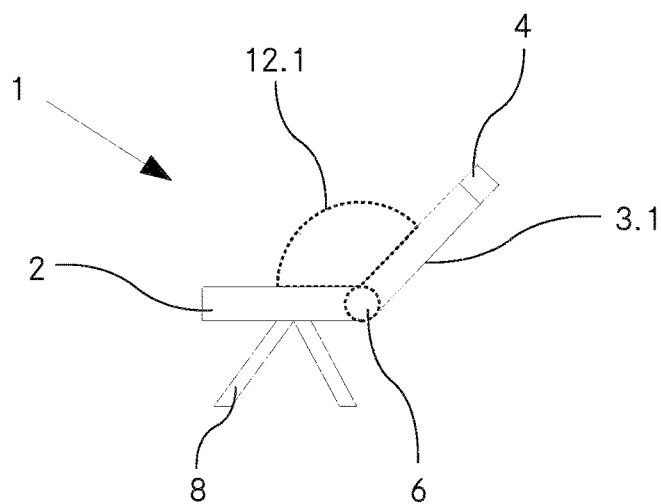
FIGS. 3a-3c show a further embodiment of the vehicle seat according to the invention with the backrest in various positions.
Figure 3B:
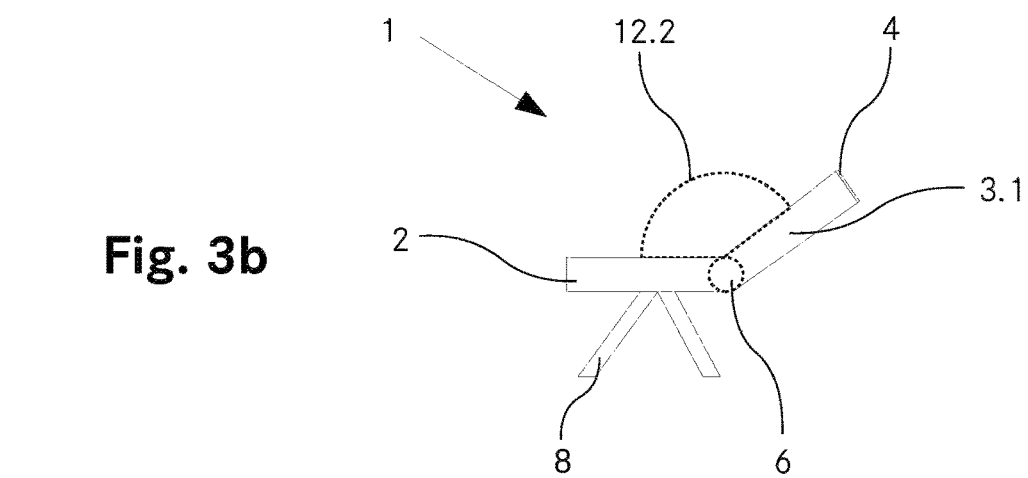
Figure 3C:
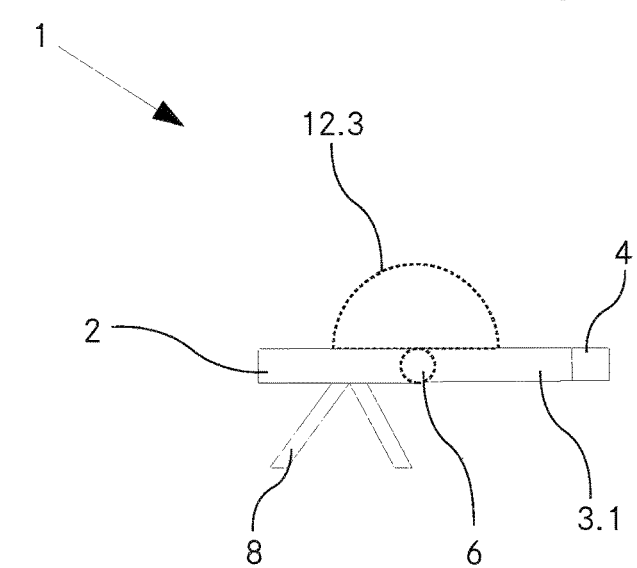

FIGS. 3a-3c show a second embodiment of a vehicle seat 1 according to the invention with an adjustable backrest 3.1. In this embodiment, the pneumatic cushion 4 is completely emptied when a first predetermined angle 12.1 between the backrest 3.1 and the seat surface 2 is reached.

FIG. 3a shows the vehicle seat 1 when the first angle 12.1 is reached. Between the first position of the backrest 3.1 and the reaching of the first angle 12.1, the pneumatic cushion 4 is completely inflated. After the backrest has passed through the first predetermined angle 12.1, the pneumatic cushion 4 is completely emptied.

In the region between the first predetermined angle 12.1 and a second predetermined angle 12.2, the pneumatic cushion 4 remains completely emptied, as is illustrated in FIG. 3b. It is only when the second predetermined angle 12.2 is reached that the pneumatic cushion 4 is inflated again.

In the second position of the backrest 3.1, the pneumatic cushion 4 is present in a completely inflated form, as is illustrated in FIG. 3c.

Figure 4:
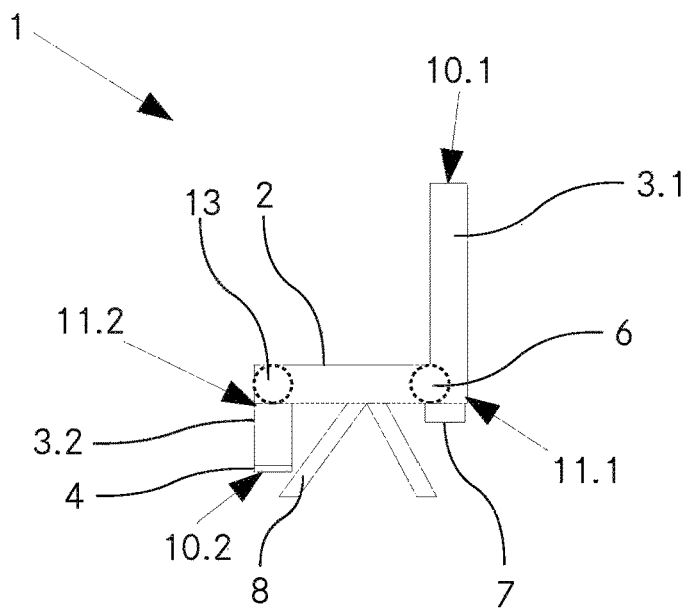
FIG. 4 shows a vehicle seat according to the invention with a legrest in the first position.

FIG. 4 shows a further embodiment of a vehicle seat 1 according to the invention having a movable legrest 3.2. The legrest 3.2 is movable, via a second adjusting mechanism 13, from a first position, in which the legrest 3.2 is substantially at right angles to the seat surface 2, into a second position, in which the legrest 3.2 and the seat surface 2 form a substantially flat surface (see FIG. 6).

The legrest 3.2 rests against the seat surface 2 with a first end 11.2. A second end 10.2 of the legrest 3.2 comprises a pneumatic cushion 4 which can be inflated or emptied by means of a pump 7. Furthermore, the vehicle seat 1 comprises a backrest 3.1 which is movable relative to the seat surface 2 via a first adjusting mechanism 6. In the embodiment shown, the backrest does not have a pneumatic cushion. However, as an alternative, a further pneumatic cushion can also be arranged at the second end 10.1 of the backrest 3.1, as is shown in the embodiments in FIGS. 1 and 3.

Figure 5:
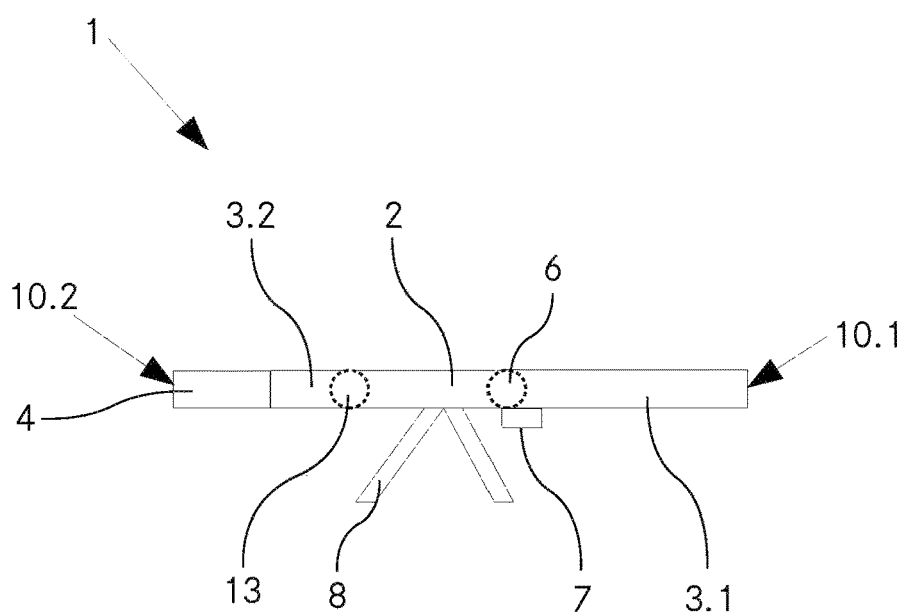
FIG. 5 shows the vehicle seat from FIG. 4 with the legrest in the second position.

FIG. 5 shows the vehicle seat 1 from FIG. 4 in the second position, wherein both the legrest 3.2 and the backrest 3.1 have been moved relative to the seat surface 2 in order to form a substantially flat surface. During the movement of the legrest 3.2 from the first position into the second position, the pneumatic cushion 4 was completely inflated by the pump 7. The pump 7 and any valves are controlled via a control device (not shown) in this embodiment, too.

The invention claimed is:

1. A vehicle seat comprising a seat surface and at least one rest part at an angle to the seat surface, wherein the angle between the seat surface and the at least one rest part can be altered via an adjusting device between a first position, in which the at least one rest part is substantially at right angles to the seat surface, and a second position, in which the seat surface and the at least one rest part form a substantially flat surface, wherein the at least one rest part rests on the seat surface with a first end, wherein a second end of the at least one rest part comprises at least one pneumatic cushion which is fluidically connected to a pump, wherein the pump is controlled by a control device which is configured such that the pneumatic cushion is substantially completely emptied or inflated by the pump when the at least one rest part moves from the first position into the second position, and wherein said second end of said rest part consists exclusively of the at least one pneumatic cushion.

2. The vehicle seat as claimed in claim 1, wherein the rest part is in the form of a backrest and the control device is configured such that the at least one pneumatic cushion is substantially completely emptied by the pump when the backrest moves from the first position into the second position.

3. The vehicle seat as claimed in claim 2, wherein the vehicle seat has a frame, wherein, in the second position, the second end of the backrest is at least partially enclosed by the frame.

4. The vehicle seat as claimed in claim 2, wherein the frame is arranged so as to be immovable at least in the horizontal direction relative to the seat surface.

5. The vehicle seat as claimed in claim 1, wherein the rest part is in the form of a legrest and the control device is configured such that the at least one pneumatic cushion is substantially completely inflated by the pump when the legrest moves from the first position into the second position.

6. The vehicle seat as claimed in claim 1, wherein the control device is configured such that the pneumatic cushion is inflated or emptied by the pump depending on the angle between the seat surface and the at least one rest part.

7. The vehicle seat as claimed in claim 1, wherein the vehicle seat comprises a pressure sensor which continuously measures the pressure of a fluid located in the at least one pneumatic cushion, wherein the control device is configured such that, in the event of a predetermined maximum pressure being exceeded, fluid is emptied from the at least one pneumatic cushion by the pump until the predetermined maximum pressure is reached.

8. The vehicle seat as claimed in claim 1, wherein the vehicle seat is an aircraft seat.

9. A method for moving at least one rest part of a vehicle seat from a first position, in which the at least one rest part is substantially at right angles to a seat surface, into a second position, in which the at least one rest part forms a substantially flat surface with the seat surface, wherein at least one pneumatic cushion comprised at said second end of the at least one rest part is completely emptied or inflated by a pump during a movement of the at least one rest part from the first position into the second position, said second end of said rest part consisting exclusively of the at least one pneumatic cushion.

10. The method as claimed in claim 9, wherein a backrest is moved, and wherein the at least one pneumatic cushion is completely emptied during the movement from the first position into the second position.

11. The method as claimed in claim 10, wherein the at least one pneumatic cushion is completely emptied by the pump when a first predetermined angle between the backrest and the seat surface is reached, and is subsequently filled again when a second predetermined angle is reached, such that the at least one pneumatic cushion is in an at least partially inflated state when the second position is reached by the backrest.

12. The method as claimed in claim 10, wherein the at least one pneumatic cushion is in a completely emptied state when the second position is reached by the backrest.

13. The method as claimed in claim 10, wherein the pressure of a fluid filled into the at least one pneumatic cushion is continuously measured by means of a pressure sensor and, in the event of a predetermined maximum pressure being exceeded, fluid is emptied via the pump until the pressure corresponds to the maximum pressure.

14. The method as claimed in claim 9, wherein a legrest is moved, wherein the at least one pneumatic cushion is completely inflated when the legrest moves from the first position into the second position.

* * * * *